United States Patent
Chiang et al.

(10) Patent No.: US 11,294,217 B2
(45) Date of Patent: Apr. 5, 2022

(54) TRANSPARENT DISPLAY PANEL AND ELECTRONIC EQUIPMENT

(71) Applicant: SHENZHEN CHINA STAR OPTOELECTRONICS SEMICONDUCTOR DISPLAY TECHNOLOGY CO., LTD., Shenzhen (CN)

(72) Inventors: Pojen Chiang, Shenzhen (CN); Galatu Suri, Shenzhen (CN)

( * ) Notice: Subject to any disclaimer, the term of this patent is extended or adjusted under 35 U.S.C. 154(b) by 233 days.

(21) Appl. No.: 16/627,372

(22) PCT Filed: Dec. 5, 2019

(86) PCT No.: PCT/CN2019/123157
§ 371 (c)(1),
(2) Date: Dec. 30, 2019

(87) PCT Pub. No.: WO2021/103085
PCT Pub. Date: Jun. 3, 2021

(65) Prior Publication Data
US 2021/0405405 A1 Dec. 30, 2021

(30) Foreign Application Priority Data
Nov. 26, 2019 (CN) .......................... 201911177187.1

(51) Int. Cl.
*G02F 1/1334* (2006.01)
*G02F 1/1333* (2006.01)
*G02F 1/13357* (2006.01)
*G02F 1/137* (2006.01)

(52) U.S. Cl.
CPC ............ *G02F 1/1334* (2013.01); *G02F 1/137* (2013.01); *G02F 1/133342* (2021.01); *G02F 1/133615* (2013.01); *G02F 1/133621* (2013.01); *G02F 2203/01* (2013.01)

(58) Field of Classification Search
CPC ...................................... G02F 1/1334
See application file for complete search history.

(56) References Cited

U.S. PATENT DOCUMENTS

| | | | |
|---|---|---|---|
| 2011/0096261 A1 | 4/2011 | Kobayashi | |
| 2012/0309254 A1 | 12/2012 | Kim | |
| 2016/0205687 A1 | 7/2016 | Ouchi et al. | |
| 2017/0167703 A1* | 6/2017 | Cok | H05B 45/10 |

(Continued)

FOREIGN PATENT DOCUMENTS

| | | |
|---|---|---|
| CN | 101281317 A | 10/2008 |
| CN | 102742343 A | 10/2012 |

(Continued)

*Primary Examiner* — Edmond C Lau

(57) ABSTRACT

A transparent display panel and an electronic equipment are provided. The transparent display panel includes a first transparent substrate, a second transparent substrate disposed opposite to the first transparent substrate, a backlight module disposed below the first transparent substrate, and a liquid crystal layer disposed between the first transparent substrate and the second transparent substrate. Furthermore, the liquid crystal layer is a polymer dispersed liquid crystal layer. The backlight module includes a lateral light source, and the lateral light source includes a plurality of color backlight units.

6 Claims, 3 Drawing Sheets

(56) References Cited

U.S. PATENT DOCUMENTS

2018/0059448 A1    3/2018  Wang et al.
2019/0361272 A1*  11/2019  Yang .................... G02B 6/0083
2020/0150490 A1*   5/2020  Mizuno ............. G02F 1/133605

FOREIGN PATENT DOCUMENTS

| CN | 103293744 A  | 9/2013  |
|----|--------------|---------|
| CN | 105954933 A  | 9/2016  |
| CN | 106292030 A  | 1/2017  |
| CN | 107229157 A  | 10/2017 |
| CN | 107479219 A  | 12/2017 |
| CN | 107797338 A  | 3/2018  |
| CN | 207337002 U  | 5/2018  |
| CN | 108628024 A  | 10/2018 |
| WO | 2018049292 A1| 3/2018  |

\* cited by examiner

TRANSPARENT DISPLAY PANEL AND ELECTRONIC EQUIPMENT

FIELD OF INVENTION

The present disclosure relates to the field of electronic display, and particularly relates to a transparent display panel and an electronic equipment.

BACKGROUND OF INVENTION

With the development of display technology, transparent display screens are increasingly used in commercial applications. The transparent display screens not only have a display function, but also enable users to see an object behind the screen. Meanwhile, touch technology and intelligent display technology are integrated into the transparent display screens to have collaborative effects such as demonstration, interaction, advertising, etc., greatly improving user experience for consumers.

Transparent liquid crystal display screens have mature techniques and inexpensive costs, and are mainstream transparent display screens. However, polarizers and color film layers in the transparent display screens affect light transmissive effect of the transparent display screens, reducing a light penetration rate of the transparent display panels.

SUMMARY OF INVENTION

In order to solve the problems mentioned above, the present disclosure provides a transparent display panel, and a light transmittance rate of the transparent display panel is greater than 50%.

Specifically, the transparent display panel includes:

A first transparent substrate, a second transparent substrate disposed opposite to the first transparent substrate, a backlight module disposed below the first transparent substrate, and a liquid crystal layer disposed between the first transparent substrate and the second transparent substrate.

Furthermore, the liquid crystal layer is a polymer dispersed liquid crystal layer.

The backlight module includes a lateral light source, and the lateral light source includes a plurality of color backlight units.

According to an aspect among the present disclosure, each of the color backlight units includes a plurality of micro light emitting diodes.

According to an aspect among the present disclosure, any three adjacent color backlight units are respectively a red light emitting diode, a green light emitting diode, and a blue light emitting diode.

According to an aspect among the present disclosure, the liquid crystal layer includes a polymer and a plurality of liquid crystal molecules dispersed evenly in the polymer. The plurality of liquid crystal molecules are in a first state or in a second state.

Furthermore, when the plurality of liquid crystal molecules are in the first state, an axial direction of the plurality of liquid crystal molecules is perpendicular to the first transparent substrate.

When the plurality of are in the second state, an axial direction of the plurality of liquid crystal molecules are parallel to the first transparent substrate.

According to an aspect among the present disclosure, the transparent display panel further includes a plurality of driving electrodes, and the driving electrodes are respectively located on surfaces of the first transparent substrate and the second transparent substrate adjacent to the liquid crystal layer. When a driving voltage is applied to the driving electrodes, the plurality of liquid crystal molecules are in the first state. When voltages on two ends of the driving electrodes are zero, the plurality of liquid crystal molecules are in the second state.

According to an aspect among the present disclosure, an included angle between a light exit surface of the color backlight units and the first transparent substrate is a first included angle, and the first included angle is an obtuse angle. An included angle between the light exiting surface of the color backlight units and the second transparent substrate is a second included angle, and the second included angle is an acute angle.

According to an aspect among the present disclosure, an incidence angle of light emitted from the color backlight units on a first light exit surface of the second transparent substrate is equal to the second included angle, and the second included angle is greater than a critical angle at which total reflection occurs when light emits from the first light exit surface.

According to an aspect among the present disclosure, an incidence angle of reflected light of the first light exit surface on a second light exit surface of the first transparent substrate is equal to the second included angle, and the second included angle is greater than a critical angle at which total reflection occurs when light emits from the second light exit surface.

According to an aspect among the present disclosure, the first transparent substrate and the second transparent substrate have equal thicknesses and materials.

Correspondingly, the present disclosure further provides an electronic equipment, the electronic equipment includes the transparent display panel mentioned above.

The present disclosure uses color backlight sources to provide backlight to a transparent display panel, which replaces a white backlight structure and a color film layer in the prior art. Meanwhile, the present disclosure uses liquid crystal molecules aligned uniformly to act as a liquid crystal layer of the display panel, replacing liquid crystal molecules and polarizers in the prior art. Therefore, the display panel of the present disclosure does not need to dispose a polarizer and a color film layer to realize normal display effect, which eliminates blocking of the polarizer and the color film layer, substantially increases a light transmittance rate of the transparent display panel, and optimizes the display effect of the transparent display screen.

DETAILED DESCRIPTION OF PREFERRED EMBODIMENTS

Figure 1:
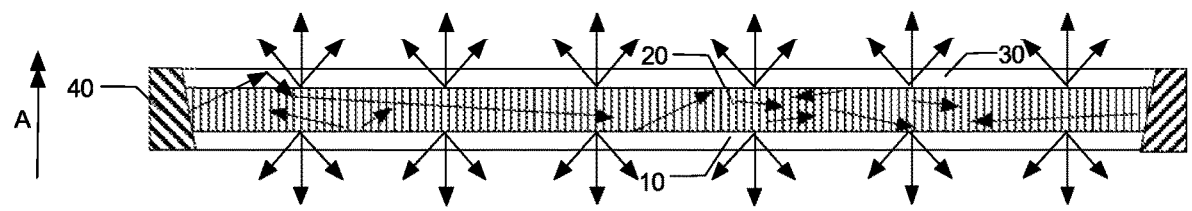
FIG. 1 is a structural schematic diagram of a transparent display panel in a first state in a specific embodiment of the present disclosure.

The descriptions of embodiments below refer to accompanying drawings in order to illustrate certain embodiments which the present disclosure can implement. The directional terms of which the present disclosure mentions, for example, "top", "bottom", "upper", "lower", "front", "rear", "left", "right", "inside", "outside", "side", etc., only refer to directions of the accompanying figures. Therefore, the used directional terms are for illustrating and understanding the present disclosure, but not for limiting the present disclosure. In the figures, units with similar structures are indicated by the same reference numerals.

In order to solve the problems mentioned above, the present disclosure provides a transparent display panel, and a light transmittance rate of the transparent display panel is greater than 50%.

Figure 5:
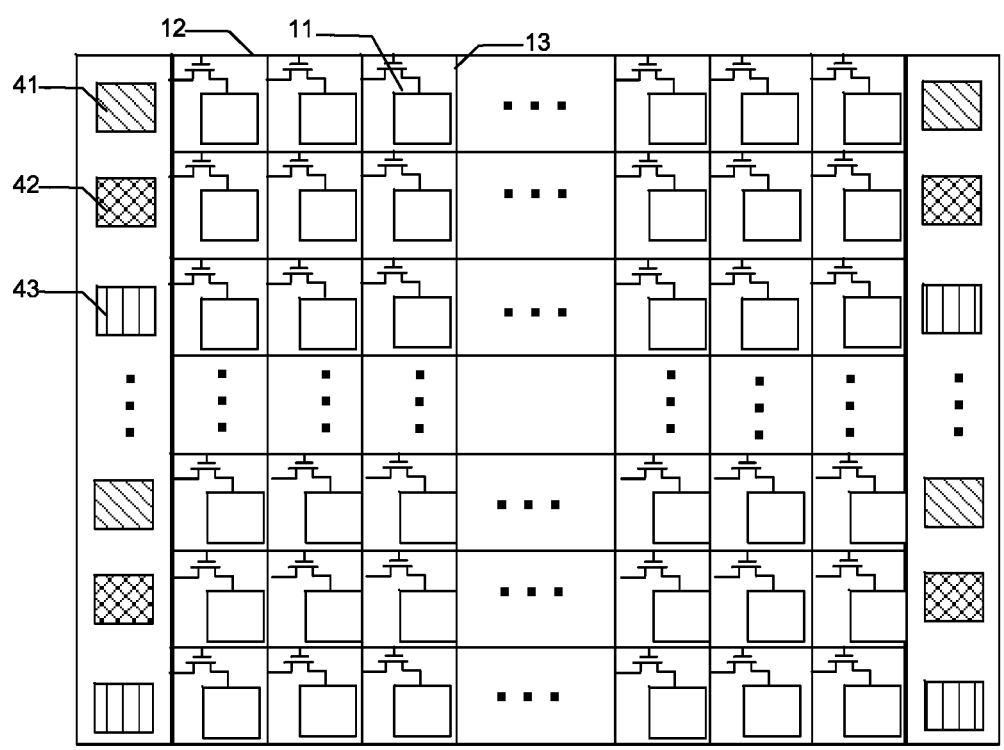
FIG. 5 is a top view of the transparent display panel of a specific embodiment of the present disclosure.

Specifically, please refer to FIG. 1 and FIG. 5, the transparent display panel includes a first transparent substrate 10, a second transparent substrate 30, a liquid crystal layer 20, and a backlight module 40. The second transparent substrate is disposed opposite to the first transparent substrate. The backlight module is disposed below the first transparent substrate. The liquid crystal layer is disposed between the first transparent substrate and the second transparent substrate. In this embodiment, the first transparent substrate 10 is an array substrate, the second transparent substrate 30 is a color film substrate, and the liquid crystal layer is a polymer dispersed liquid crystal layer. The backlight module includes a lateral light source, and the lateral light source includes a plurality of color backlight units.

In the present disclosure, a plurality of subpixels are disposed on the first transparent substrate 10, and each of the subpixels includes a switch element and a pixel electrode 11 connected to the switch element. In this embodiment, the switch element is a thin film transistor. A source electrode of the thin film transistor is connected to a data line of the display panel. A gate electrode of the thin film transistor is connected to a gate line of the display panel. A drain electrode of the thin film transistor is connected to the pixel electrode of a light emitting structure. The plurality of pixel electrodes 11 are arranged in multiple rows along a first direction and are arranged in multiple columns along a second direction. Please refer to FIG. 5, the display panel includes a plurality of data lines 12 arranged along the first direction and a plurality of gate lines 13 arranged along the second direction. Each of the pixel electrodes 11 is electrically connected to the data lines 12 and the gate lines 13 by the thin film transistor connected to itself. The plurality of pixel electrodes 11 constitute a plurality of pixel points of the transparent display panel.

Figure 2:
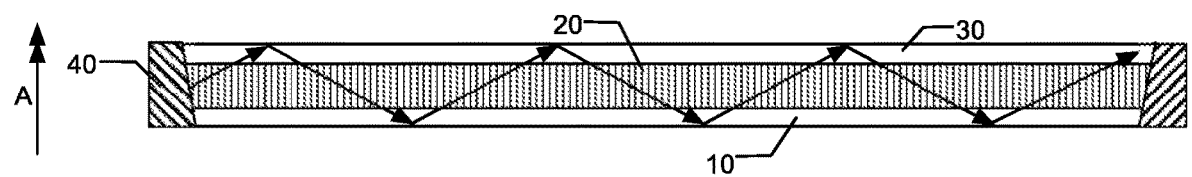
FIG. 2 is a structural schematic diagram of the transparent display panel in a second state in a specific embodiment of the present disclosure.

Please refer to FIG. 1 and FIG. 2, the second transparent substrate 30 is disposed opposite to the first transparent substrate 10. A surface of the second transparent substrate 30 away from the first transparent substrate 10 is a first light exit surface. A surface of the first transparent substrate 10 away from the second transparent substrate 30 is a second light exit surface. The liquid crystal layer 20 is located between the first transparent substrate 10 and the second transparent substrate 30, and the liquid crystal layer 20 includes a plurality of liquid crystal molecules aligned uniformly Please refer to FIG. 1, the backlight module 40 is located on two opposite lateral surfaces of the liquid crystal layer 20. The opposite two lateral surfaces are perpendicular to the light exit surface. Please refer to FIG. 5, the backlight module 40 includes a plurality of color backlight units, and each of the color backlight units is correspondingly disposed with one row of driving units. Each of the color backlight units includes a plurality of micro light emitting diodes. By film thinning, microaturizing, and arraying light emitting units of the light emitting diodes, the micro light emitting diodes can be obtained. A dimension of a single micro light emitting diode ranges from 1 μm to 10 μm, and the micro light emitting diode can realize the self-illuminous function the same as organic light emitting diodes. The dimension of the micro light emitting diodes usually ranges from $\frac{1}{100}$ to $\frac{1}{50}$ of a dimension of a traditional backlight light source, and backlight with uniform brightness can be obtained without a light guide plate and a diffusion plate. Meanwhile, when assembling the backlight module, a light exit surface of the micro light emitting diodes is configured to form an acute angle with the first transparent substrate and an obtuse angle with the second transparent substrate, which can make backlight light directly project to corresponding pixel points and does not need to dispose a reflective sheet.

In the present disclosure, when the plurality of light emitting units act as the backlight light source of the liquid crystal display panel, it is necessary for the plurality of light emitting units to respectively emit red light, blue light, and green light to constitute the pixel points of the display panel.

In this embodiment, please refer to FIG. 5, three adjacent color backlight units are respectively a red light emitting diode 41, a green light emitting diode 42, and a blue light emitting diode 43. For example, the micro light emitting diodes 41 corresponding to a plurality of red pixel points located in the same row emit red light, the micro light emitting diodes 42 corresponding to a plurality of green pixel points located in the same row emit green light, and the micro light emitting diodes 43 corresponding to a plurality of blue light emitting diodes located in the same row emit blue light. The three adjacent different color pixel electrodes located in the same column constitute one of the pixel units.

Figure 3:
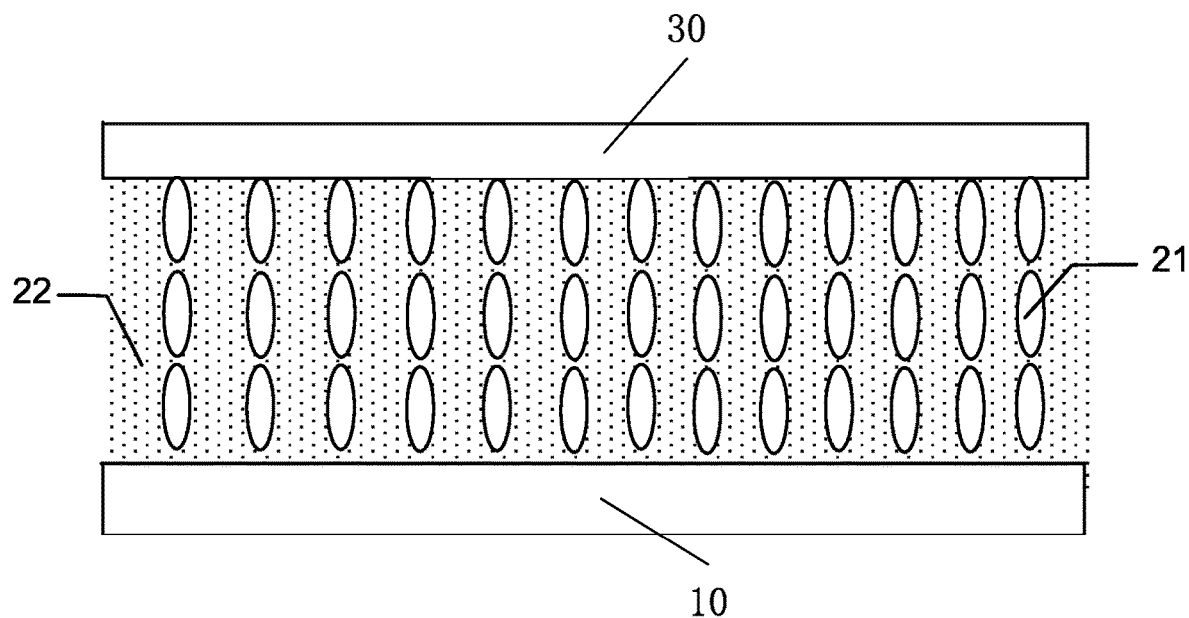
FIG. 3 is a structural schematic diagram of liquid crystal molecules in the transparent display panel in FIG. 1.
Figure 4:
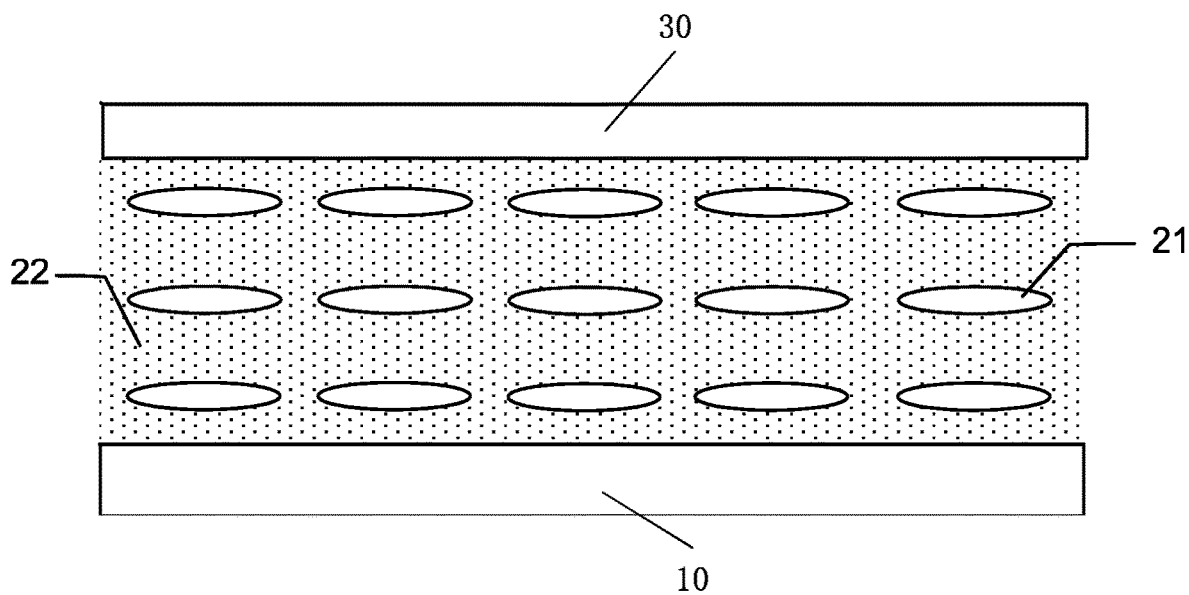
FIG. 4 is a structural schematic diagram of the liquid crystal molecules in the transparent display panel in FIG. 2.

Please refer to FIG. 3 and FIG. 4, in the present disclosure, the liquid crystal layer 20 includes a polymer 22 and a plurality of liquid crystal molecules 21 dispersed evenly in the polymer 22. The plurality of liquid crystal molecules 21 are in a first state or in a second state. The transparent display panel includes a plurality of driving electrodes. The driving electrodes are respectively located on surfaces of the first transparent substrate and the second transparent substrate adjacent to the liquid crystal layer. In this embodiment, the driving electrodes include pixel electrodes located on the first transparent substrate and common electrodes located on the second transparent substrate (color film substrate). When a driving voltage is applied to the driving electrodes, the plurality of liquid crystal molecules are in the first state. When voltages on two ends of the driving electrodes are zero, the plurality of liquid crystal molecules are in the second state.

In this embodiment, an included angle between a light exit surface of the backlight module 40 and the first transparent substrate 10 is a first included angle, and the first included angle is an obtuse angle. An included angle between the light exit surface of the backlight module 40 and the second transparent substrate 30 is a second included angle, and the second included angle is a acute angle. An incidence angle of light emitted from the backlight module 40 on a first light exit surface of the second transparent substrate 30 is equal to the second included angle, and the second included angle is greater than a critical angle at which total reflection occurs when light emits from the first light exit surface. An incidence angle of reflected light of the first light exit surface on a second light exit surface of the first transparent substrate 10 is equal to the second included angle, and the second included angle is greater than a critical angle at which total reflection occurs when light emits from the second light exit surface.

Please refer to FIG. 1 and FIG. 3, when the plurality of liquid crystal molecules 21 are in the first state, an axial direction of the plurality of liquid crystal molecules 21 is perpendicular to the first transparent substrate. At this time, a refractive index of the liquid crystal molecules 21 does not match a refractive index of the polymer 22, and the light diffuses in the liquid crystal layer and penetrates the first transparent substrate 10 and the second transparent substrate 30 to realize the display function.

Please refer to FIG. 2 and FIG. 4, when the plurality of liquid crystal molecules 21 are in the second state, the axial direction of the plurality of liquid crystal molecules 21 is parallel to the first transparent substrate. At this time, a refractive index of the liquid crystal molecules 21 matches the refractive index of the polymer 22, and the light is totally reflected in the liquid crystal layer and cannot penetrate the first transparent substrate 10 and the second transparent substrate 30 to realize the light transmissive effect.

In the present disclosure, in order to ensure the first transparent substrate 10 and the second transparent substrate 30 have same total reflection angles, the first transparent substrate 10 and the second transparent substrate 30 have equal thicknesses and materials.

The present disclosure uses color backlight sources to provide backlight to a transparent display panel, which replaces a white backlight structure and a color film layer in the prior art. Meanwhile, the present disclosure uses liquid crystal molecules aligned uniformly to act as a liquid crystal layer of the display panel, replacing liquid crystal molecules and polarizers in the prior art. Therefore, the display panel of the present disclosure does not need to dispose a polarizer and a color film layer to realize normal display effect, which eliminates blocking of the polarizer and the color film layer, extremely increases a light transmittance rate of the transparent display panel, and optimizes the display effect of the transparent display screen.

Accordingly, the present disclosure further provides an electronic equipment, and the electronic equipment includes the transparent display panel mentioned above. The electronic equipment may be a transparent showcase or a transparent show window.

In summary, although the present disclosure has disclosed the preferred embodiments as above, however the above-mentioned preferred embodiments are not to limit to the present disclosure. A person skilled in the art can make any change and modification, therefore the scope of protection of the present disclosure is subject to the scope defined by the claims.

What is claimed is:

1. A transparent display panel, wherein the transparent display panel comprises:
   a first transparent substrate, a second transparent substrate disposed opposite to the first transparent substrate, a backlight module disposed below the first transparent substrate, a liquid crystal layer disposed between the first transparent substrate and the second transparent substrate, and a plurality of driving electrodes respectively located on surfaces of the first transparent substrate and the second transparent substrate adjacent to the liquid crystal layer,
   wherein the liquid crystal layer is a polymer dispersed liquid crystal layer, and the liquid crystal layer comprises a polymer and a plurality of liquid crystal molecules dispersed evenly in the polymer, the backlight module comprises a lateral light source, and the lateral light source comprises a plurality of color backlight units;
   wherein the plurality of liquid crystal molecules are in a first state or in a second state; when the plurality of liquid crystal molecules are in the first state, an axial direction of the plurality of liquid crystal molecules is perpendicular to the first transparent substrate; and when the plurality of liquid crystal molecules are in the second state, an axial direction of the plurality of liquid crystal molecules are parallel to the first transparent substrate;
   wherein when a driving voltage is applied to the driving electrodes, the plurality of liquid crystal molecules are in the first state, and when voltages on two ends of the driving electrodes are zero, the plurality of liquid crystal molecules are in the second state;
   wherein an included angle between a light exit surface of the color backlight units and the first transparent substrate is a first included angle, and the first included angle is an obtuse angle, and wherein an included angle between the light exit surface of the color backlight units and the second transparent substrate is a second included angle, and the second included angle is an acute angle; and
   wherein an incidence angle of light emitted from the color backlight units on a first light exit surface of the second transparent substrate is equal to the second included angle, and the second included angle is greater than a critical angle at which total reflection occurs when light emits from the first light exit surface.

2. The transparent display panel as claimed in claim 1, wherein each of the color backlight units comprises a plurality of micro light emitting diodes.

3. The transparent display panel as claimed in claim 2, wherein any three adjacent color backlight units are respectively a red light emitting diode, a green light emitting diode, and a blue light emitting diode.

4. The transparent display panel as claimed in claim 1, wherein an incidence angle of reflected light of the first light exit surface on a second light exit surface of the first transparent substrate is equal to the second included angle, and the second included angle is greater than a critical angle at which total reflection occurs when light emits from the second light exit surface.

5. The transparent display panel as claimed in claim 4, wherein the first transparent substrate and the second transparent substrate have equal thicknesses and materials.

6. An electronic equipment, wherein the electronic equipment comprises a transparent display panel, and the transparent display panel comprises:
   a first transparent substrate, a second transparent substrate disposed opposite to the first transparent substrate, a backlight module disposed below the first transparent substrate, a liquid crystal layer disposed between the first transparent substrate and the second transparent substrate, and a plurality of driving electrodes respectively located on surfaces of the first transparent substrate and the second transparent substrate adjacent to the liquid crystal layer,
   wherein the liquid crystal layer is a polymer dispersed liquid crystal layer, and the liquid crystal layer comprises a polymer and a plurality of liquid crystal molecules dispersed evenly in the polymer, the backlight module comprises a lateral light source, and the lateral light source comprises a plurality of color backlight units;
   wherein the plurality of liquid crystal molecules are in a first state or in a second state; when the plurality of liquid crystal molecules are in the first state, an axial direction of the plurality of liquid crystal molecules is perpendicular to the first transparent substrate; and when the plurality of liquid crystal molecules are in the second state, an axial direction of the plurality of liquid crystal molecules are parallel to the first transparent substrate;

wherein when a driving voltage is applied to the driving electrodes, the plurality of liquid crystal molecules are in the first state, and when voltages on two ends of the driving electrodes are zero, the plurality of liquid crystal molecules are in the second state;

wherein an included angle between a light exit surface of the color backlight units and the first transparent substrate is a first included angle, and the first included angle is an obtuse angle, and wherein an included angle between the light exit surface of the color backlight units and the second transparent substrate is a second included angle, and the second included angle is an acute angle; and wherein an incidence angle of light emitted from the color backlight units on a first light exit surface of the second transparent substrate is equal to the second included angle, and the second included angle is greater than a critical angle at which total reflection occurs when light emits from the first light exit surface.

* * * * *